W. Painter,
Fastening Blacking-Box Rims.
N° 49,782. Patented Sep. 5, 1865.
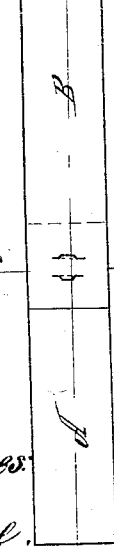
Fig. 1.
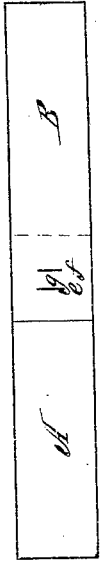
Fig. 2.
Fig. 4.
Fig. 3.
Fig. 5.
Witnesses:
Lewis R. Kjozer
W. J. Clark
Inventor:
W. Painter

UNITED STATES PATENT OFFICE.

WILLIAM PAINTER, OF BALTIMORE, MARYLAND.

IMPROVED METHOD OF JOINING SHEET-METAL BANDS, &c.

Specification forming part of Letters Patent No. 49,782, dated September 5, 1865.

*To all whom it may concern:*

Be it known that I, WILLIAM PAINTER, of Baltimore, in the county of Baltimore and State of Maryland, have invented a new and Improved Method of Fastening Together the Ends of Rims of Blacking-Boxes and for similar Purposes; and I do hereby declare that the following is a full and exact description of the same, reference being had to the accompanying drawings, making part of this specification, in which—

Figure 1 is a top view of the fastening complete; Fig. 2, same, showing fastening partially finished; Fig. 3, longitudinal section through line $a\,b$; Fig. 4, transverse section through line $c\,d$.

The nature of my invention consists in joining pieces or parts of metal, without the use of solder or rivets, by forming a lock or fastening from the parts themselves.

To enable others skilled in the art to make and use my invention, I will proceed to describe its construction and operation.

The ends of pieces A B, Fig. 1, to be joined, are lapped in the manner of soldering, as shown, and by a suitable device two parallel incisions, $e\,f$, Fig. 2, are made through both pieces of metal simultaneously, the parts $g$, between them, at the same time being thrown up above the common surface, as clearly shown in Figs. 3 and 4. To prevent the parts so raised from becoming separated by one of them being drawn back through the opening $h$, they are expanded by a blow from a hammer, causing the edges to spread over the edges of the opening $h$, as shown in Figs. 1 and 3, thus securely fastening the parts together.

This device may be varied by spreading the edges of the opening to make it smaller, so that the raised parts may not pass back, or by forcing down the edges of the incisions, instead of raising the parts between them, and expanding either or both to accomplish the same purpose, as shown in Fig. 5.

What I claim as my invention, and desire to secure by Letters Patent, is—

The lock or fastening for rims of blacking-boxes and similar purposes, formed by making incisions through the lap and raising and expanding the parts between them, substantially in the manner described.

W. PAINTER.

Witnesses:
 LEWIS R. KEIZER,
 W. J. CLARK.